US011512009B2

(12) United States Patent
Oki (10) Patent No.: US 11,512,009 B2
(45) Date of Patent: Nov. 29, 2022

(54) FLOATATION SEPARATION APPARATUS

(71) Applicant: KURITA WATER INDUSTRIES LTD., Tokyo (JP)

(72) Inventor: Koichi Oki, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 852 days.

(21) Appl. No.: 16/334,599

(22) PCT Filed: Sep. 13, 2017

(86) PCT No.: PCT/JP2017/033059
§ 371 (c)(1),
(2) Date: Mar. 19, 2019

(87) PCT Pub. No.: WO2018/066331
PCT Pub. Date: Apr. 12, 2018

(65) Prior Publication Data
US 2020/0165143 A1    May 28, 2020

(30) Foreign Application Priority Data
Oct. 5, 2016 (JP) .............................. JP2016-197299

(51) Int. Cl.
*C02F 1/24* (2006.01)
*C02F 1/40* (2006.01)
*C02F 1/52* (2006.01)
*C02F 103/14* (2006.01)

(52) U.S. Cl.
CPC .................. *C02F 1/24* (2013.01); *C02F 1/40* (2013.01); *C02F 1/52* (2013.01); *C02F 2103/14* (2013.01)

(58) Field of Classification Search
CPC ...... C02F 1/24; C02F 1/40; C02F 1/52; C02F 2103/14
(Continued)

(56) References Cited

U.S. PATENT DOCUMENTS 4,108,768 A    8/1978    Sebelik et al.
4,551,246 A    11/1985   Coffing
(Continued)

FOREIGN PATENT DOCUMENTS

CN    105689157 A    6/2016
CN    105855067 A    8/2016
(Continued)

OTHER PUBLICATIONS

China Patent Office, "Office Action for Chinese Patent Application No. 201780061416.6," dated May 6, 2021.
(Continued)

*Primary Examiner* — Thomas M Lithgow
(74) *Attorney, Agent, or Firm* — Manabu Kanesaka (57) ABSTRACT

A floatation separation apparatus includes a stirring tank, a stirring pump installed in the stirring tank, a floatation tank into which flocculated water flows from the stirring tank through an overflow dam, a scraping device (scraper) configured to scrape floating substances in the floatation tank, a treated water tank into which treated water in the floatation tank flows, and a pump and a hose for returning the treated water in the treated water tank to a raw water tank. The stirring pump sucks air and water inside the stirring tank, and discharges water mixed with air bubbles to a lower part of the stirring tank. The height of the overflow dam is adjustable.

8 Claims, 6 Drawing Sheets

(58) Field of Classification Search
USPC .......................................... 210/221.1, 221.2
See application file for complete search history.

(56) References Cited

U.S. PATENT DOCUMENTS

| | | | | |
|---|---|---|---|---|
| 6,964,740 B2 * | 11/2005 | Morse | ................ | B01D 19/0005 |
| | | | | 210/205 |
| 2008/0047903 A1 * | 2/2008 | Morse | ................ | B01F 13/1016 |
| | | | | 210/704 |

FOREIGN PATENT DOCUMENTS

| | | | |
|---|---|---|---|
| JP | S50-105750 U | | 8/1975 |
| JP | S63-190691 A | | 8/1988 |
| JP | 2000-350992 A | | 12/2000 |
| JP | 2007-069104 A | | 3/2007 |
| JP | 2008-264741 A | | 11/2008 |
| JP | 2009113041 A | * | 5/2009 |
| JP | 2010-058066 A | | 3/2010 |
| KR | 20160029272 A | | 3/2016 |

OTHER PUBLICATIONS

"Air flotation method for water purification [气浮法净水]" Air Flotation and Water Purification Research Group of Tongji University [同济大学气浮 净水科研小组], Nov. 30, 1980, p. 121, China Construction Industry Press [中国建筑工 业出版社].
PCT/ISA/210, "International Search Report for International Application No. PCT/JP2017/033059," dated Oct. 10, 2017.

* cited by examiner

FLOATATION SEPARATION APPARATUS

TECHNICAL FIELD

The present invention relates to a floatation separation apparatus configured to add a flocculant to raw water and treat the raw water through floatation separation. More specifically, the present invention relates to a floatation separation apparatus preferable for usage in floatation separation of a paint sediment contained in coating waste solution.

BACKGROUND ART

In a conventional coating method, an object having a complicate shape, such as an automobile, a building material, and an electronic product is often coated by a spray coating method of spraying paint in a coating booth. In this spray coating method, the amount of paint that contributes to coating is about 30% of the amount of sprayed paint, and the remaining about 70% of the paint is surplus paint. The surplus paint is typically captured by water curtain or the like provided in the coating booth, and is collected into circulating water. Then, the circulating water containing the surplus paint component is collected in a circulating water pit, and thereafter, the circulating water and the paint component are separated from each other by a predetermined method.

PTL 1 discloses a paint waste solution separation apparatus. In this apparatus, flocculant powder is mixed into circulating water containing a paint component and stirred to achieve floatation separation of the circulating water and the paint component. Then, the floating paint component is discharged by a scraping device.

PTL 1: JP 2008-264741 A

In PTL 1, the floatation separation is performed by using a pressurization water pump (vortex flow pump) to generate minute air bubbles by mixing air into treated water in a floatation separation apparatus by stirring. However, the vortex flow pump, which is a clear water pump, is likely to degrade due to SS components contained in the treated water, and needs to be frequently replaced.

The water content ratio of a paint sediment subjected to floatation separation increases and the SS recovery rate thereof decreases as the consolidation status at a floatation part degrade. Accordingly, the SS concentration in the treated water increases, which degrades the pressurization water pump and the treatment performance of the whole apparatus.

Flocculant powder is used in the apparatus according to PTL 1, but has disadvantage such that cutout failure occurs in the apparatus and the flocculant powder is likely to scatter.

In the apparatus according to PTL 1, the amount of intake air through a water intake port of a submersible pump depends on adjustment of the amount of raw water, and thus a necessary amount of treated water potentially cannot be obtained.

In the apparatus according to PTL 1, stirring is needed at three stages in the apparatus, and maintainability of a second stirring unit is poor. Furthermore, the apparatus needs to have a complicate shape to provide freedom to the second stirring unit and facilitate maintenance.

In the apparatus according to PTL 1, the scraping device is small and can scrape only part of the water surface of a floatation tank. As a result, the floating paint sediment accumulates and dries and cannot be sufficiently recovered.

SUMMARY OF INVENTION

The present invention is intended to provide a floatation separation apparatus including: a stirring tank into which raw water and a flocculant are introduced; a pump provided in the stirring tank and configured to suck air and the raw water to which the flocculant is added through a suction port and discharge the air and the flocculant to a lower part inside the stirring tank; a floatation tank into which flocculated water in the stirring tank flows over an overflow dam; and a scraping device configured to scrape floating substances in the floatation tank. The floatation separation apparatus is capable of adjusting the amount of air entrained by the pump.

In the present invention, cases expressed by "stirring tank into which raw water and a flocculant are introduced" include a case in which the raw water and the flocculant are separately introduced into the stirring tank, and a case in which the raw water to which the flocculant is added in advance is introduced into the stirring tank.

The floatation separation apparatus according to the present invention includes: a stirring tank into which raw water and a flocculant are introduced; a pump provided in the stirring tank and configured to suck air and the raw water to which the flocculant is added through a suction port and discharge the air and the flocculant to a lower part inside the stirring tank; a floatation tank into which flocculated water in the stirring tank flows over an overflow dam; and a scraping device configured to scrape floating substances in the floatation tank. At least one of the overflow dam and the pump is movable upward and downward.

According to an aspect of the present invention, the pump is a stirring pump including an impeller.

According to another aspect of the present invention, the overflow dam includes a flashboard extending upward at a tilt toward the stirring tank.

According to another aspect of the present invention, the scraping device scrapes floating substances across an entire water surface of the floatation tank.

According to another aspect of the present invention, an inside of the floatation tank is divided into a plurality of small floatation tanks by a first partition plate, and floating substances in each small floatation tank are scraped by the common scraping device.

According to another aspect of the present invention, an inside of the stirring tank is divided into a plurality of small stirring tanks by a second partition plate, and each small stirring tank is disposed adjacent to the corresponding one of the small floatation tanks.

Advantageous Effects of Invention

In a floatation separation apparatus according to the present invention, an overflow dam is movable upward and downward, and the distance between the water surface of a stirring tank and a suction port of a pump can be adjusted by adjusting the height of at least one of the overflow dam and the pump in the up-down direction. Accordingly, the amount of air entrained by the pump can be adjusted.

DESCRIPTION OF EMBODIMENTS

Figure 1:
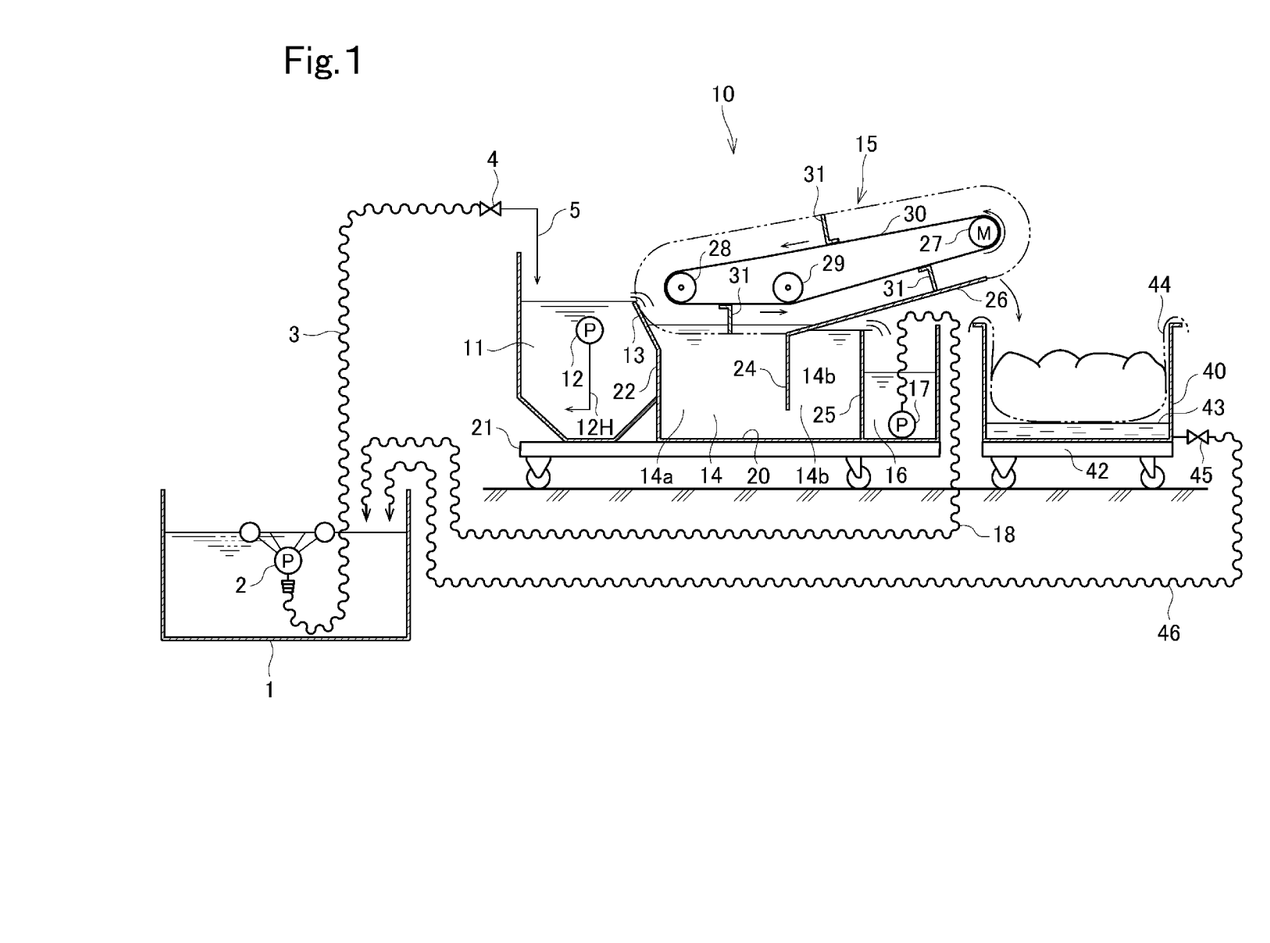
FIG. 1 is a longitudinal sectional view of a spray-coating discharged water treatment apparatus including a floatation separation apparatus according to an embodiment.

The following describes embodiments with reference to the accompanying drawings. FIG. 1 illustrates a spray-coating discharged water treatment apparatus including a floatation separation apparatus according to a first embodiment. In this treatment apparatus, spray-coating discharged water containing a paint component is transferred from a raw water tank (sediment pool) 1 to a floatation separation apparatus 10 through a float pump 2, a hose 3, a valve 4, and a pipe 5. The water is then subjected to floatation separation, and floating substances are scraped by a scraping device and dropped into a recovery tank 40.

The floatation separation apparatus 10 includes a stirring tank 11, a stirring pump 12 installed in the stirring tank 11, a floatation tank 14 into which flocculated water flows from the stirring tank 11 through an overflow dam 13, a scraper 15 as the scraping device configured to scrape floating substances in the floatation tank 14, a treated water tank 16 into which treated water in the floatation tank 14 flows, and a pump 17 and a hose 18 for sending the treated water in the treated water tank 16 back to a raw water tank 1.

A cross beam (omitted in FIGS. 1 and 2; refer to FIGS. 3 to 6) over the stirring tank 11 is provided to suspend and hold the stirring pump 12.

The stirring pump 12 sucks air and water in the stirring tank 11, and discharges water mixed with air bubbles to a lower part of the stirring tank 11.

The stirring pump 12 is preferably a dirt submersible pump that includes an impeller and a bipolar motor having a high rotation speed and has a large diameter for passing foreign objects. The stirring pump 12 is installed in an inversely suspended state. The stirring pump 12 includes a controller configured to control, through an inverter, the motor for stirring intensity and suction amount adjustment. It is preferable that an upper limit frequency is 55 Hz or lower, which does not exceed the rated current value of the pump motor. A thermal protector typically installed on the submersible pump potentially adversely affects the inverter body at automatic restoration, and thus is preferably removed. Legs of the submersible pump, which interfere with water intake of floatation sediment, are preferably cut.

The leading end (lower end) of a discharge pipe 12H from the stirring pump 12 is bifurcated, and the stirring tank 11 has a bottom part and an overflow part in sophisticated shapes. With this configuration, swirl flow is generated in the tank, and raw water is guided to the stirring pump, thereby achieving an increased stirring effect. Accordingly, it is possible to achieve flock formation having a sufficient floatation property through the two-stage stirring.

A tank unit 20 of the stirring tank 11, the floatation tank 14, and the treated water tank 16 is integrally formed and placed on a base 21. A first division plate 22 is erected to divide the stirring tank 11 and the floatation tank 14, and the overflow dam 13 is installed above the first division plate 22.

Figure 2:
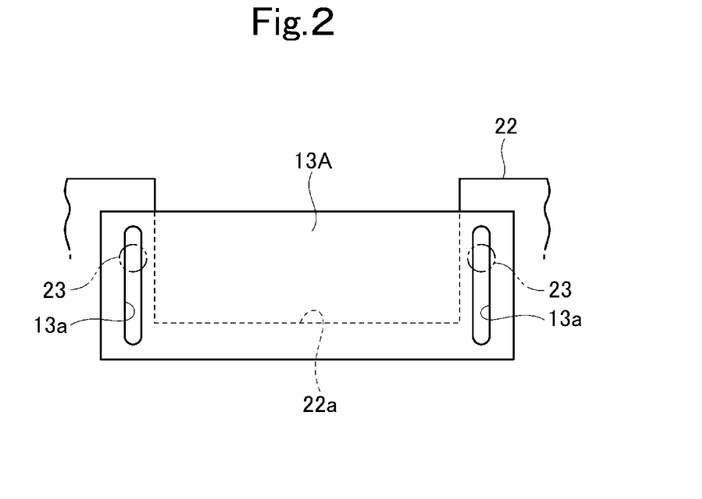
FIG. 2 is a front view of a flashboard.

The overflow dam 13 includes an overflow plate 13A illustrated in FIG. 2. The overflow plate 13A has a tetragonal shape (in the present embodiment, a rectangular shape), and has long holes 13a extending in the up-down direction at right and left ends. The overflow plate 13A is disposed overlapping an overflow opening 22a provided as a downward cut from the upper edge of the first division plate 22.

The overflow plate 13A is attached to the first division plate 22 by fixation members 23, such as bolts and nuts, inserted in the long holes 13a. When the fixation members 23 are loosened, the overflow plate 13A becomes movable upward and downward. After being moved to a desired height, the overflow plate 13A is fixed at the desired height by fastening the fixation members 23.

The first division plate 22 has an upper part tilted toward the stirring tank 11, and the overflow plate 13A is also tilted toward the stirring tank 11.

The inside of the floatation tank 14 is partitioned into a floatation chamber 14a and a clarified water chamber 14b by a second division plate 24. The lower end of the second division plate 24 is positioned higher than the bottom surface of the floatation tank 14 by a predetermined height. The floatation chamber 14a and the clarified water chamber 14b are communicated with each other below the second division plate 24.

The clarified water chamber 14b and the treated water tank 16 are separated from each other by a third division plate 25 erected on the bottom surface of the tank unit 20. Clarified water flows into the treated water tank 16 over the upper edge of the third division plate 25. The height of the upper end of the third division plate 25 is the water surface level of the floatation tank 14.

The upper end of the second division plate 24 is positioned slightly lower than the water surface level of the floatation tank 14. The upper end of the second division plate 24 is coupled with the base end of a scraper tray 26. The scraper tray 26 extends above the clarified water chamber 14b and the treated water tank 16, and has a leading end extending from the tank unit 20 to a position above the recovery tank 40. The scraper tray 26 is tilted to have a higher height at a position closer to the leading end.

The scraper 15 includes a drive sprocket wheel 27, a driven sprocket wheel 28, a guide sprocket wheel 29, and a chain 30 bridged over the sprocket wheels 27 and 28 and the guide sprocket wheel 29 in an endlessly rotatable manner, and a scraper blade 31 attached to the chain 30. The drive sprocket wheel 27 is positioned above the leading end of the scraper tray 26. The driven sprocket wheel 28 is positioned near a place above the first division plate 22. The guide sprocket wheel 29 is positioned above the second division plate 24.

When the drive sprocket wheel 27 is driven by a drive motor, the chain 30 rotates and the scraper blade 31 rotates as indicated by an arrow in FIG. 1, so that floating substances in the floatation chamber 14a are scraped into the recovery tank 40. The scraper blade 31 moves from the vicinity of the first division plate 22 to the second division plate 24 near the water surface of the floatation chamber 14a, and then slides on the upper surface of the scraper tray 26. The scraper blade 31 is preferably made of PTFE to prevent adhesion of a paint sediment and deformation by a solvent.

The recovery tank 40 is installed on a movable base 42. A water penetration plate 43 made of punching metal or the like is installed at a bottom part in the recovery tank 40. A flexible container bag (having the water penetration property) 44 is disposed above the water penetration plate 43.

Water below the water penetration plate 43 can return to the raw water tank 1 through a valve 45 and a hose 46.

In the spray-coating discharged water treatment apparatus including the floatation separation apparatus 10 thus configured, spray-coating discharged water as raw water is introduced to the raw water tank 1 and sent to the stirring tank 11 through the float pump 2, the hose 3, the valve 4, and the pipe 5. A flocculant is added to the raw water in the raw water tank 1 and/or the stirring tank 11 by a chemical feeding apparatus (not illustrated).

The flocculant may be one or two or more of an inorganic flocculant such as basic aluminum chloride, sulfuric acid band, aluminum chloride, or aluminum nitrate; an anionic polymer flocculant such as copolymer of acrylamide and acrylic acid (Na) or polyacrylic acid (Na); a non-ionic polymer flocculant such as polyacrylamide; and a cationic polymer flocculant such as homopolymer of dimethyl amino ethyl (meta) acrylate (containing quaternary ammonium salt such as benzyl chloride or methyl chloride) or copolymer of dimethyl amino ethyl (meta) acrylate (containing quaternary ammonium salt such as benzyl chloride or methyl chloride) and acrylamide, but is not limited thereto. The flocculant is preferably liquid flocculant (such as water solution, dispersion, or W/O emulsion) in terms of handling easiness. In addition, a well-known spray-coating discharged water treatment agent other than the flocculants may be used together. When a well-known spray-coating discharged water treatment agent other than the flocculants is used together, the spray-coating discharged water treatment agent is typically added in the raw water tank 1 and/or a circulating water path (not illustrated) provided separately from the raw water tank 1, but the present invention is not limited thereto.

The raw water to which the flocculant is added is subjected to air entrained by the stirring pump 12 and discharged to the lower part of the stirring tank 11 through the discharge pipe 12H. Water containing flocculation flock to which air bubbles adhere flows up in the stirring tank 11 and flows into the floatation chamber 14a of the floatation tank 14 over the overflow dam 13. The flock in the water having flowed into the chamber floats in the floatation chamber 14a due to the buoyance of air bubbles, and is scraped by the scraper 15 and dropped into the flexible container bag 44. Water in the flock penetrates through the flexible container bag 44, flows into below the water penetration plate 43, and returns to the raw water tank 1 through the hose 46.

Water separated from the flock in the floatation chamber 14a flows down in the floatation chamber 14a, and flows below the second division plate 24 into the clarified water chamber 14b. The water then flows into the treated water tank 16 over the upper end of the third division plate 25, and returns to the raw water tank 1 through the pump 17 and the hose 18.

In the floatation separation apparatus 10, the water level of the stirring tank 11 can be adjusted by adjusting the height of the overflow dam 13. Accordingly, the distance between a suction port of the pump and the water surface can be adjusted to adjust the amount of air entrained by the pump 12. The amount of entrained air can be adjusted in accordance with the amount of the paint component and the floatation property of the flock in the raw water, and the status of air bubbles in the apparatus. In addition, the amount of treated water is stabilized. Moreover, the amount of entrained air can be further adjusted by controlling the rotation speed of the stirring pump 12 through the inverter.

When a pressurization water pump is not used as the pump 12, the cost and frequency of maintenance due to degradation of the pressurization water pump can be reduced.

When the flocculant added to the stirring tank is liquid flocculant, chemical (flocculant) handling is easy.

In the floatation separation apparatus 10, the scraper 15 scrapes floating substances substantially across the entire water surface of the floatation chamber 14a. Thus, the recovery rate of the paint component is improved, and a recovery trouble is prevented. Moreover, the rotation speed of the scraper 15 can be adjusted to a scraping speed in accordance with the consolidation status and bubble adsorption status of floating substances, thereby improving the recovery rate of the paint component and the water content ratio of recovered substances.

The stirring tank 11 and the floatation tank 14 preferably have capacities with which the accumulation time of water under treatment is one to two minutes approximately, thereby achieving downsizing of the whole apparatus. The floatation separation apparatus 10 has a water area load (20 to 30 m/h) significantly larger than that of any other floatation separation apparatus (4 to 8 m/h), and thus is preferably used for separation of flock having a good floatation property (large floatation speed), but is applicable to usage other than a paint sediment.

In FIG. 1, the float pump 2 and the pump 17 are used to transfer raw water and treated water, but the present invention is not limited thereto. For example, a diaphragm pump may be provided halfway through the hose 3 to suck the raw water accumulated in the raw water tank 1 through a suction port of the hose 3 or the like. The pump 17 may be omitted when spontaneous flow is available for returning from the treated water tank 16 to the raw water tank 1.

In FIG. 1, the treated water tank 16 is provided below the scraper tray 26. However, in an apparatus in which a stirring tank and a floatation tank are not partitioned into a plurality of parts, the treated water tank 16 may be provided on a side of the floatation separation apparatus 10 as in a configuration illustrated in FIGS. 3 and 4 to be described later. With disposition as illustrated in FIGS. 3 and 4, it is possible to achieve more compactness (space saving) of the apparatus.

Figure 3:
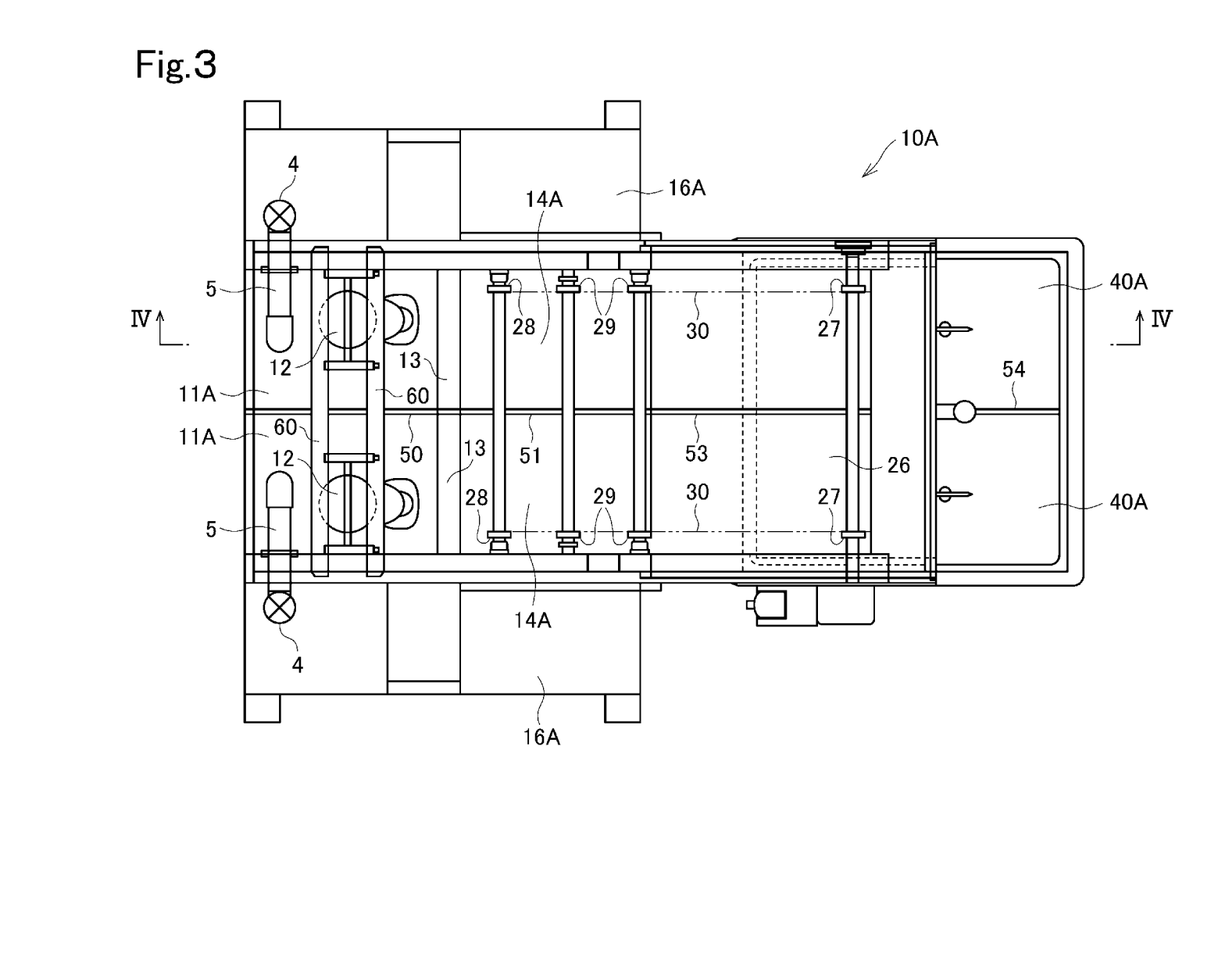
FIG. 3 is a plan view of a floatation separation apparatus according to another embodiment.
Figure 4:
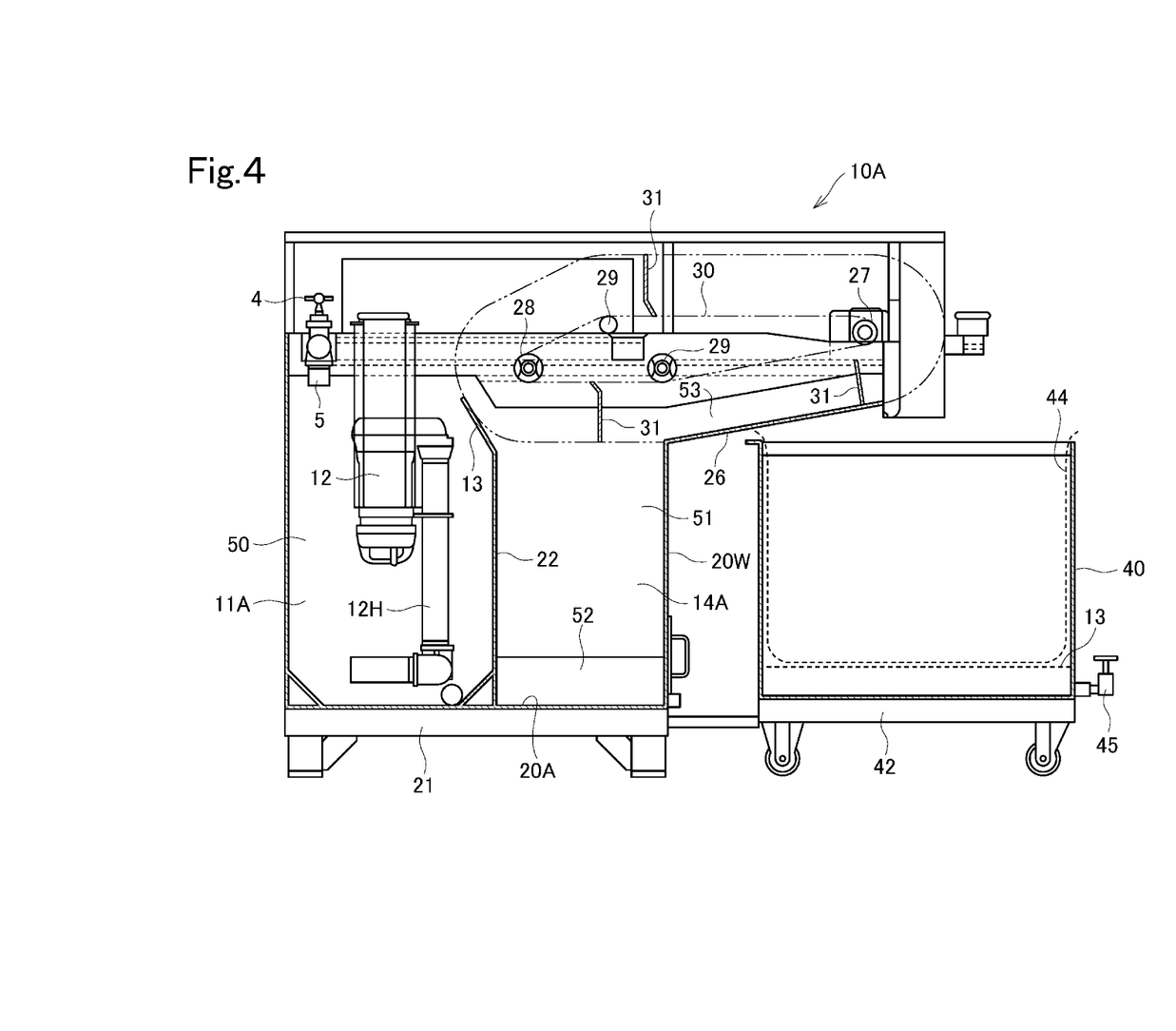
FIG. 4 is a cross-sectional view taken along line IV-IV in FIG. 3.

FIGS. 3 and 4 illustrate a plan view and a cross-sectional view of a floatation separation apparatus 10A according to a second embodiment.

In the floatation separation apparatus 10A, a partition plate 50 is provided to partition the inside of the stirring tank 11 into two small stirring tanks 11A, 11A. The partition plate 50 extends in the longitudinal direction of the floatation separation apparatus 10A.

Raw water introduction pipes 5, 5 are provided to introduce raw water to the respective small stirring tanks 11A, 11A. The small stirring tanks 11A are provided with stirring pumps 12, respectively. In the floatation separation apparatus 10A, a cross beam 60 is provided over the stirring tank 11, and the stirring pump 12 is held in a suspended state from the cross beam 60.

The inside of the floatation tank 14 is partitioned into two small floatation tanks 14A, 14A by a partition plate 51. The partition plate 51 extends in the longitudinal direction of the floatation separation apparatus 10A, and is continuous and flush with the partition plate 50. Accordingly, each floatation tank 14A is disposed adjacent to the corresponding small stirring tank 11A with the overflow dam 13 disposed therebetween.

In the present embodiment, each small treated water tank 16A is provided on a side of the floatation separation apparatus 10A with respect to the corresponding small floatation tank 14A. The small treated water tanks 16A are disposed outside of sidewalls of a tank unit 20A.

An advection port 52 is opened at a lower part of a sidewall of the tank unit 20A so that each small floatation tank 14A and the corresponding small treated water tank 16A are communicated with each other therethrough. The pump 17 (not illustrated in FIGS. 3 and 4) is installed in each small treated water tank 16A and connected with the hose 18 (not illustrated in FIGS. 3 and 4).

The scraper tray 26 has a base end continuous with the upper end of a tank wall 20W of the tank unit 20A on an end side. The scraper tray 26 extends from the tank unit 20A to above the recovery tank 40 so that the height thereof is higher on the leading end side. The scraper tray 26 is partitioned into two zones on the upper surface side by a partition plate 53. The partition plate 53 is continuous and flush with an upper part of the partition plate 51.

The scraper 15 has a configuration the same as that illustrated in FIGS. 1 and 2 except that that the scraper blade 31 is divided into right and left parts so that the parts move inside the two zones, respectively. The other configuration of the floatation separation apparatus 10A is the same as that of the floatation separation apparatus 10, and identical components are denoted by an identical reference sign.

In the floatation separation apparatus 10A, raw water is supplied to each small stirring tank 11A, mixed with the flocculant, and stirred by the stirring pump 12. Thereafter, the raw water flows from the small stirring tank 11A into the small floatation tank 14A over the overflow dam 13. Floating substances in the small floatation tank 14A are scraped by the scraper 15, and fall into the flexible container bag 44 in the recovery tank 40. The recovery tank 40 does not necessarily need to be partitioned by a partition plate.

Clarified water in the small floatation tank 14A flows into the small treated water tank 16A through the advection port 52, and returns to the raw water tank 1 through the pump 17 and the hose 18 (not illustrated) the same as those in FIGS. 1 and 2.

The floatation separation apparatus 10A in FIGS. 3 and 4 can be installed in a smaller area. In addition, the number of components, in particular, the number of components of the scraping device can be reduced.

Although the two small stirring tanks 11A, the two small floatation tanks 14A, and the two small treated water tanks 16A are provided in FIGS. 3 and 4, the number of tanks may be three or larger.

When three or more small treated water tanks 16A are installed, small treated water tanks 16A other than those on both end sides are installed outside of the tank wall 20W of the tank unit 20A on the end side.

Similarly to the configuration illustrated in FIG. 1, the float pump 2 and the pump 17 are used to transfer water and treated water in the configuration illustrated in FIGS. 3 and 4, but the present invention is not limited. For example, a diaphragm pump may be provided halfway through the hose 3 to suck the raw water accumulated in the raw water tank 1 through a suction port of the hose 3 or the like. The pump 17 may be omitted when spontaneous flow is available for returning from the treated water tank 16 to the raw water tank 1.

Figure 5:
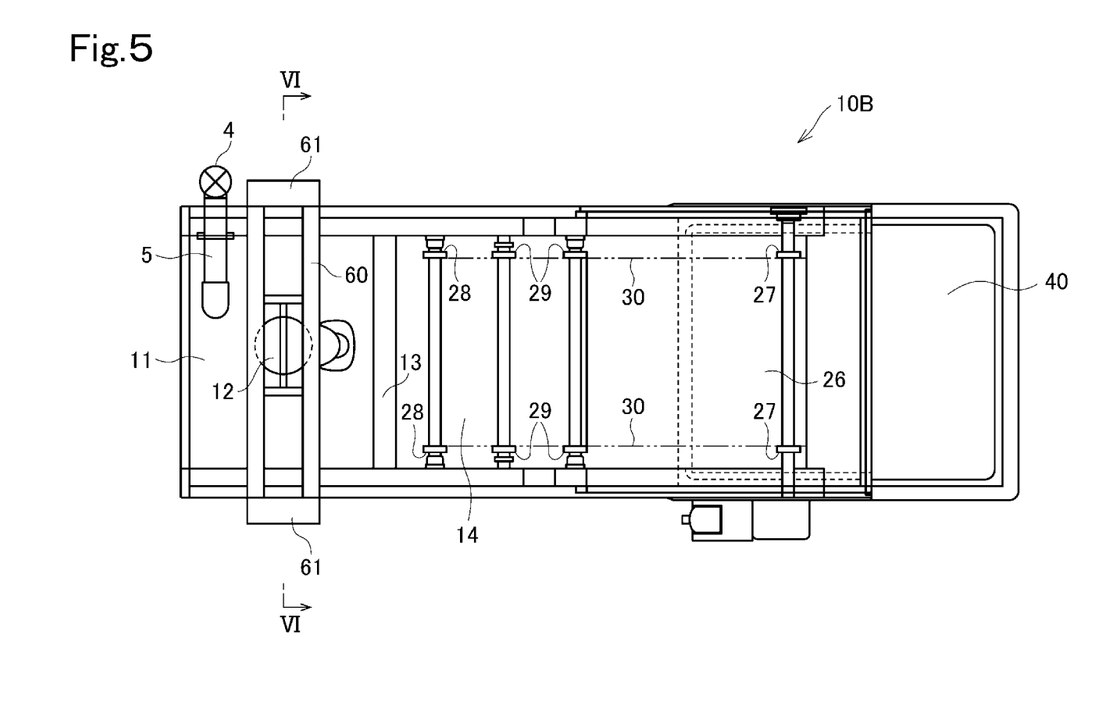
FIG. 5 is a plan view of a floatation separation apparatus according to another embodiment.
Figure 6:
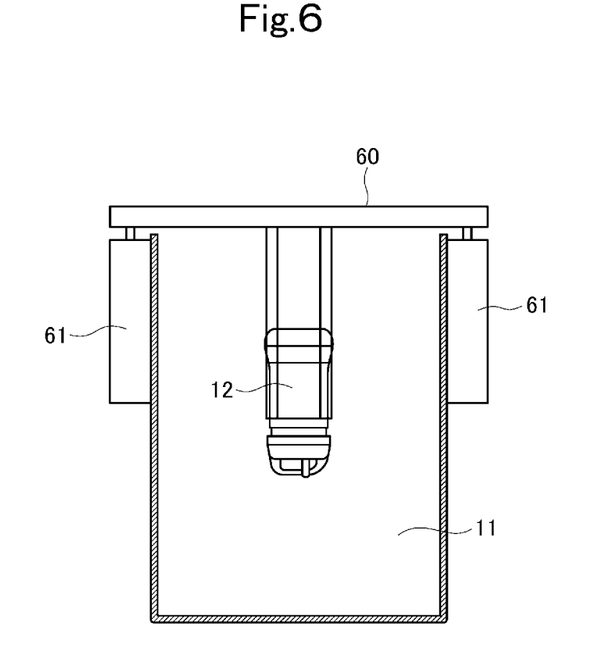
FIG. 6 is a cross-sectional view taken along line VI-VI in FIG. 5.

FIGS. 5 and 6 illustrate a plan view and a cross-sectional view of a floatation separation apparatus 10B according to a third embodiment.

In the floatation separation apparatus 10B, both ends of the cross beam 60 over the stirring tank 11 are supported by a lift device 61 such as a screw jack, and the cross beam 60 is movable upward and downward by the lift device 61. In the present embodiment, a flashboard 13 is made of a fixed plate and not movable, but may be movable as in the embodiment illustrated in FIGS. 1 and 2.

The other configuration of the floatation separation apparatus 10B is the same as that of the floatation separation apparatus 10, and identical components are denoted by an identical reference sign.

In the floatation separation apparatus 10B, the raw water is processed as in the floatation separation apparatus 10. In the floatation separation apparatus 10B, the installation height of the stirring pump 12 can be adjusted by the lift device 61 to adjust the distance between a suction port of the stirring pump 12 and the water surface of the stirring tank 11, thereby adjusting the amount of air entrained by the pump 12.

Although not illustrated, in the floatation separation apparatus 10A in FIGS. 3 and 4, the installation height of the stirring pump 12 may be adjusted by the lift device 61 as illustrated in FIGS. 5 and 6.

The above-described embodiments are examples of the present invention, and the present invention may have a configuration other than those illustrated in the drawings.

The present invention is described above in detail with reference to particular aspects, but it is clear to the skilled person in the art that various modifications are possible without departing from the gist and scope of the present invention.

The present application claims the benefit of Japanese Patent Application No. 2016-197299, filed on Oct. 5, 2016, which is hereby incorporated by reference herein in its entirety.

REFERENCE SIGNS LIST 1 raw water tank
10, 10A, 10B floatation separation apparatus
11 stirring tank
11A small stirring tank
13 overflow dam
13A overflow plate
14 floatation tank
14A small floatation tank
14a floatation chamber
14b clarified water chamber
15 scraper (scraping device)
16 treated water tank
16A small treated water tank
31 scraper blade
40 recovery tank

The invention claimed is:

1. A floatation separation apparatus comprising:
   a stirring tank into which raw water and a flocculant are introduced;
   a pump provided in the stirring tank and configured to suck air and the raw water to which the flocculant is added through a suction port and discharge the air and the flocculant to a lower part inside the stirring tank;
   a floatation tank into which flocculated water in the stirring tank flows over an overflow dam; and
   a scraping device configured to scrape floating substances in the floatation tank,
   wherein at least one of the overflow dam and the pump is movable upward and downward so that a distance between the suction port and a water surface in the stirring tank is adjustable.

2. The floatation separation apparatus according to claim 1, wherein the pump is a stirring pump including an impeller.

3. The floatation separation apparatus according to claim 1, wherein the overflow dam includes a flashboard extending upward at a tilt toward the stirring tank.

4. The floatation separation apparatus according to claim 1, wherein the scraping device scrapes floating substances from an entire water surface of the floatation tank.

5. The floatation separation apparatus according to claim 1, wherein an inside of the floatation tank is divided into a plurality of small floatation tanks by a first partition plate, and floating substances in each small floatation tank are scraped by the common scraping device.

6. The floatation separation apparatus according to claim 5, wherein an inside of the stirring tank is divided into a plurality of small stirring tanks by a second partition plate, and each small stirring tank is disposed adjacent to the corresponding one of the small floatation tanks.

7. The floatation separation apparatus according to claim 1, wherein the pump sucks air and water in the stirring tank, and discharges water mixed with air bubbles to a lower part of the stirring tank.

8. The floatation separation apparatus according to claim 7, wherein the pump includes a discharge pipe with a lower end at a bottom part of the stirring tank so that swirl flow is generated in the stirring tank.

* * * * *